United States Patent
Yuan

(10) Patent No.: US 11,128,790 B2
(45) Date of Patent: Sep. 21, 2021

(54) MONITORING METHOD AND SYSTEM FOR POSITIONING DEVICE

(71) Applicant: Wistron Corp., New Taipei (TW)

(72) Inventor: Ping Yuan, New Taipei (TW)

(73) Assignee: Wistron Corp., New Taipei (TW)

( * ) Notice: Subject to any disclaimer, the term of this patent is extended or adjusted under 35 U.S.C. 154(b) by 9 days.

(21) Appl. No.: 16/505,580

(22) Filed: Jul. 8, 2019

(65) Prior Publication Data
US 2020/0275009 A1 Aug. 27, 2020

(30) Foreign Application Priority Data
Feb. 21, 2019 (CN) .......................... 201910129604.9

(51) Int. Cl.
*H04N 5/232* (2006.01)
*G06F 3/14* (2006.01)
*G06K 19/07* (2006.01)

(52) U.S. Cl.
CPC ........... *H04N 5/23203* (2013.01); *G06F 3/14* (2013.01); *G06K 19/0723* (2013.01)

(58) Field of Classification Search
None
See application file for complete search history.

(56) References Cited

U.S. PATENT DOCUMENTS

| | | | | |
|---|---|---|---|---|
| 9,984,381 B2* | 5/2018 | Burkhart | ............ | G06K 7/10009 |
| 10,231,078 B1* | 3/2019 | Swart | ................. | G08B 13/2462 |
| 10,234,535 B2* | 3/2019 | Sloth | ..................... | G01S 5/0252 |
| 10,433,113 B2* | 10/2019 | DeAngelis | ......... | G06K 9/00342 |
| 2003/0236590 A1* | 12/2003 | Park | ....................... | B25J 9/1664 |
| | | | | 700/245 |
| 2004/0178269 A1* | 9/2004 | Pradhan | .................. | G01S 13/74 |
| | | | | 235/462.13 |
| 2005/0030160 A1* | 2/2005 | Goren | .............. | G06K 19/07733 |
| | | | | 340/10.5 |
| 2005/0278062 A1* | 12/2005 | Janert | .................... | G06Q 10/08 |
| | | | | 700/214 |

(Continued)

FOREIGN PATENT DOCUMENTS

| | | |
|---|---|---|
| CN | 206524979 U | 9/2017 |
| WO | WO 2017/015867 A1 | 2/2017 |

OTHER PUBLICATIONS

Foina, Aislan Gomide, et al. "Player Tracker—a tool to analyze sport players using RFID." 2010 8th IEEE International Conference on Pervasive Computing and Communications Workshops (PERCOM Workshops). IEEE (Year: 2010).*

(Continued)

*Primary Examiner* — Stefan Gadomski

(57) ABSTRACT

A monitoring method for a positioning device includes the following steps. The motion of a positioning device is sensed by a first sensing device in a first sensing area of a monitoring area, so as to generate a plurality of first sensing signals. The first sensing signals are received by a processing device. The first sensing signals are analyzed and calculated by the processing device to generate a first processing result associated with the motion of the positioning device. The first processing result is displayed on a display device. Therefore, the position distribution and motion trajectory of the positioning device may effectively be obtained, and the timeliness of monitoring and the convenience of use are increased.

18 Claims, 13 Drawing Sheets

(56) References Cited

U.S. PATENT DOCUMENTS

| | | | |
|---|---|---|---|
| 2006/0010027 A1* | 1/2006 | Redman | G06Q 10/06375 705/7.16 |
| 2006/0092016 A1* | 5/2006 | Modes | G01C 21/206 340/539.13 |
| 2006/0229928 A1* | 10/2006 | Nix, Jr. | G06Q 10/063 705/7.31 |
| 2009/0128333 A1* | 5/2009 | Oberle | G06Q 10/087 340/572.1 |
| 2009/0231138 A1* | 9/2009 | Lai | G06K 19/0712 340/572.4 |
| 2010/0283630 A1* | 11/2010 | Alonso | H04Q 9/00 340/870.11 |
| 2010/0295681 A1* | 11/2010 | Burns | G01S 11/06 340/572.1 |
| 2011/0211563 A1* | 9/2011 | Herrala | H04W 4/029 370/338 |
| 2013/0066448 A1* | 3/2013 | Alonso | H04Q 9/00 700/91 |
| 2014/0188432 A1* | 7/2014 | Aljadeff | G01S 5/02 702/182 |
| 2014/0240088 A1* | 8/2014 | Robinette | G08B 13/1427 340/5.61 |
| 2014/0361928 A1* | 12/2014 | Hughes | G01S 19/48 342/463 |
| 2014/0364974 A1* | 12/2014 | Wohl | G05B 15/02 700/91 |
| 2014/0379296 A1* | 12/2014 | Nathan | G06Q 10/08 702/150 |
| 2015/0116088 A1* | 4/2015 | Bellows | G06K 7/10356 340/10.1 |
| 2015/0178817 A1* | 6/2015 | Fein | G06Q 30/0252 705/26.81 |
| 2015/0248797 A1* | 9/2015 | Duggan | G06K 7/00 340/8.1 |
| 2015/0269685 A1* | 9/2015 | Takeda | E02F 9/205 705/7.22 |
| 2015/0285896 A1* | 10/2015 | Hall | G08B 7/062 340/539.13 |
| 2015/0355311 A1* | 12/2015 | O'Hagan | H04W 4/029 340/539.13 |
| 2015/0378002 A1* | 12/2015 | Hughes | G01S 5/0294 342/451 |
| 2016/0026837 A1* | 1/2016 | Good | G01S 5/0289 340/539.13 |
| 2016/0173753 A1* | 6/2016 | Corsini | H04N 5/23203 348/157 |
| 2016/0173787 A1* | 6/2016 | Yun | H04N 5/232 348/143 |
| 2016/0210547 A1* | 7/2016 | Dekeyser | G06K 19/07758 |
| 2016/0292509 A1* | 10/2016 | Kaps | A63F 13/00 |
| 2016/0371521 A1* | 12/2016 | Moon | G01S 19/34 |
| 2017/0024531 A1* | 1/2017 | Malaviya | G16H 40/20 |
| 2017/0039661 A1* | 2/2017 | Vanslette | G06Q 10/20 |
| 2017/0124836 A1* | 5/2017 | Chung | H04B 7/14 |
| 2017/0140330 A1* | 5/2017 | Rinzler | G06K 19/0723 |
| 2017/0154508 A1* | 6/2017 | Grant | G08B 13/2462 |
| 2017/0219700 A1* | 8/2017 | Hewett | G01S 13/74 |
| 2017/0237892 A1* | 8/2017 | Sakai | H04N 5/23293 348/207.11 |
| 2017/0323311 A1* | 11/2017 | Naiki | G06Q 30/02 |
| 2018/0063808 A1* | 3/2018 | Mahasenan | G01S 1/7034 |
| 2018/0077355 A1* | 3/2018 | Kouno | H04N 7/18 |
| 2018/0089475 A1* | 3/2018 | Hattori | G06K 19/0723 |
| 2018/0176727 A1* | 6/2018 | Williams | A61B 5/747 |
| 2018/0211718 A1* | 7/2018 | Heath | A01K 29/005 |
| 2018/0256945 A1* | 9/2018 | Hall | A63B 60/46 |
| 2019/0124475 A1* | 4/2019 | Swart | H04W 4/029 |
| 2019/0311451 A1* | 10/2019 | Laycock | G06K 9/00718 |
| 2019/0327124 A1* | 10/2019 | Lai | H04L 27/362 |
| 2020/0019739 A1* | 1/2020 | Moriya | G06F 3/041 |
| 2020/0064456 A1* | 2/2020 | Xu | G01S 13/56 |
| 2020/0191943 A1* | 6/2020 | Wu | G01S 13/003 |
| 2020/0200892 A1* | 6/2020 | Rajab | G01S 7/42 |

OTHER PUBLICATIONS

A. I. Baba, H. Lu, X. Xie and T. B. Pedersen, "Spatiotemporal Data Cleansing for Indoor RFID Tracking Data," 2013 IEEE 14th International Conference on Mobile Data Management, Milan, Italy, 2013, pp. 187-196, doi: 10.1109/MDM.2013.68. (Year: 2013).*

* cited by examiner

MONITORING METHOD AND SYSTEM FOR POSITIONING DEVICE

CROSS REFERENCE TO RELATED APPLICATIONS

This application claims priority of China Patent Application No. 201910129604.9, filed on Feb. 21, 2019, the entirety of which is incorporated by reference herein.

BACKGROUND OF THE INVENTION

Field of the Invention

An embodiment of the present invention relates to a monitoring method and system, and in particular it relates to a monitoring method and system for a positioning device.

Description of the Related Art

Currently, since operational staff does not work in a fixed working area, a method of spot-checking is used in order to collect information on the working state of operational staff, and the working state of the operational staff is collected in a manual manner.

However, since the manual manner of collecting information on the working state of operational staff takes a lot of labor, this labor wasted and the collected samples are less accurate. Therefore, how to effectively know the working state of operational staff has become a focus of technical improvements by various manufacturers.

BRIEF SUMMARY OF THE INVENTION

An embodiment of the present invention provides a monitoring method and system for a positioning device, thereby effectively allowing the user to know the position distribution and movement trajectory of the positioning device and increasing the timeliness of monitoring and the convenience of use.

An embodiment of the present invention provides a monitoring method for a positioning device, which includes the following steps. The motion of a positioning device is sensed by a first sensing device in a first sensing area of a monitoring area to generate a plurality of first sensing signals. The first sensing signals are received by a processing device. The first sensing signals are analyzed and calculated by the processing device to generate a first processing result associated with the motion of the positioning device. The first processing result is displayed on a display device.

In addition, an embodiment of the present invention provides a monitoring system for a positioning device, which includes a positioning device, a first sensing device, a processing device and a display device. The positioning device is configured to move in a monitoring area. The first sensing device is configured to sense the motion of the positioning device in a first sensing area of the monitoring area to generate a plurality of first sensing signals. The processing device is configured to receive the first sensing signals, and analyze and calculate the first sensing signals to generate a first processing result associated with the motion of the positioning device. The display device is configured to display the first processing result.

According to the monitoring method and system for the positioning device disclosed by the embodiment of the present invention, the sensing device senses the motion of the positioning device in the sensing area of the monitoring area to generate the first sensing signals. The processing device receives the sensing signals, analyzes and calculates the sensing signals to generate the first processing result associated with the motion of the positioning device, and displays the first processing result. Therefore, the position distribution and the movement trajectory of the positioning device may effectively be known, and the timeliness of monitoring and the convenience of use are increased.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In each of the following embodiments, the same reference number represents the same or similar element or component.

Figure 1:
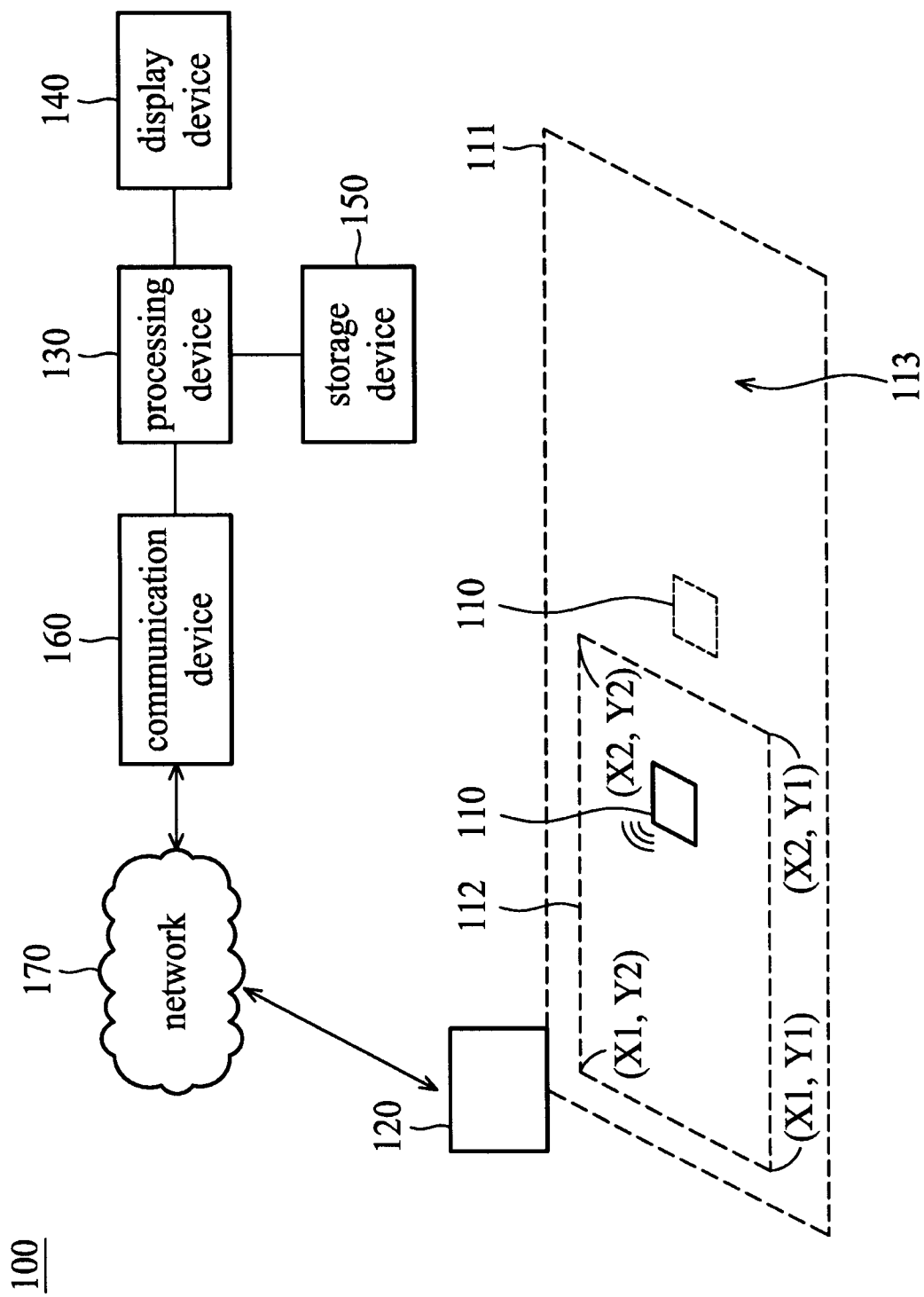
FIG. 1 shows a schematic view of a monitoring system for a positioning device according to an embodiment of the present invention.

FIG. 1 shows a schematic view of a monitoring system for a positioning device according to an embodiment of the present invention. Please refer to FIG. 1. The monitoring system for the positioning device 100 includes a positioning device 110, a sensing device 120, a processing device 130 and a display device 140.

The processing device 130 may be a general-purpose processor, a micro control unit (MCU), an application processor (AP), a digital signal processor (DSP), etc. The processing device 130 may include various circuit logic for providing functions of data processing and computing, controlling the operation of communication device 160 to provide network connections, reading or storing data from storage device 150, and receiving or outputting signals from the input and output device (not shown). In particular, the processing device 130 is configured to coordinate the operation of the communication device 160, the storage device 150 and the input and output device to perform the monitoring method for the positioning device of embodiments in the present application. In particular, the storage device 150 further stores the program codes of the monitoring method for the positioning device of embodiments in the present application and the program codes are loaded and performed by the processing device 130. The communication device 160 is configured to provide a network connection to a network 170, and may further be connected to a plurality of devices in the factory, the sensing device 120 and the remote server through the network 170. The communication device 160 may provide the network connection through a wired manner, such as Ethernet, optical fiber network, asymmetric digital subscriber line (ADSL), etc. Alternatively, the communication device 160 may also provide the network connection through a wireless manner, such as wireless fidelity (WiFi) technology, or other telecommunication network technologies.

The positioning device 110 is configured to move in a monitoring area 111. In the embodiment, the positioning device 110 includes, for example, a radio frequency identification (RFID) electronic tag, an ultra-wide-band (UWB) electronic tag, other electronic tags for positioning, etc. The ultra-wide-band is a wireless communication manner that uses nanosecond-level non-sinusoidal narrow pulses to transmit data. The ultra-wideband technology uses high-bandwidth, fast pulse mode and has excellent penetration. In addition, the positioning device 110 may be mounted, for example, on a movable object, such as a person, a tool vehicle, etc.

In the embodiment, the sensing device 120 may be a base station. In addition, the monitoring area 111 is a sensing range that the sensing device 120 may sense the positioning device 110. The sensing area 112 is defined by, for example, a coordinate (X1, Y1), a coordinate (X2, Y1), a coordinate (X1, Y2), and a coordinate (X2, Y2). In addition, the position of the sensing device 120 illustrated in FIG. 1 is a schematic position, and is not intended to limit the setting position of the sensing device 120.

In the embodiment, the processing device 130 may define the sensing area 112 as an effective working area, wherein the sensing area 112 is, for example, an electric fence. That is, the time when the positioning device 110 is located in the sensing area 112 may be regarded as an effective working-hour. In addition, the processing device 130 may define an area 113 outside the sensing area 112 in the monitoring area 111 as an ineffective working area. That is, the time when the positioning device 110 is located outside the sensing area 112 may be regarded as an ineffective working-hour.

The sensing device 120 may be configured to sense the motion of the positioning device 110 in the sensing area 112 to generate a plurality of first sensing signals. That is, when the positioning device 110 enters the range of the sensing region 112, the sensing device 120 may sense the existence of the positioning device 110 to generate a corresponding sensing signal. Furthermore, as the positioning device 110 moves in the sensing area 112, the sensing device 120 may generate the sensing signals corresponding to different positions of the positioning device 110.

For example, when the positioning device 110 enters the sensing area 112 and located in a position A of the sensing area 112, the sensing device 120 may sense the existence of the positioning device 110 to generate a sensing signal A1 corresponding to the position A, wherein the sensing signal A1 includes a generation time TA1. Then, when the positioning device 110 is located in a position B of the sensing area 112, for example, the positioning device 110 moves to the position B from the position A, the sensing device 120 generates a sensing signal B1 corresponding to the position B, wherein the sensing signal B1 includes a generation time TB1. Afterward, when the positioning device 110 is located in a position C of the sensing area 112, for example, the positioning device 110 moves to the position C from the position B, the sensing device 120 generates a sensing signal C1 corresponding to the position C, wherein the sensing signal C1 includes a generation time TC1. The rest of sensing signals corresponding to other positions are similar and their operation may be discerned by analogy.

Then, when the positioning device 110 is again located in the position B of the sensing area 112, for example, the positioning device 110 moves to the position B from the position C, the sensing device 120 generates a sensing signal B2 corresponding to the position B, wherein the sensing signal B2 includes a generation time TB2. Afterward, when the positioning device 110 is again located in the position A of the sensing area 112, for example, the positioning device 110 moves to the position A from the position B, the sensing device 120 generates a sensing signal A2 corresponding to the position A, wherein the sensing signal A2 includes a generation time TA2. Then, when the positioning device 110 leaves the sensing area 112, for example, the positioning device 110 moves to the area 113 from the position A, the sensing device 120 generates, for example, a sensing signal XX1, wherein the sensing signal includes a generation time TXX1. The rest of sensing signals corresponding to other positions are similar and their operation may be discerned by analogy.

The processing device 130 receives the sensing signals generated by the sensing device 120 through the network 170. The processing device 130 analyzes and calculates the sensing signals to generate a first processing result. That is, when the processing device 130 receives the sensing signals generated by the sensing device 120, the processing device 130 may analyze the sensing signals to obtain a plurality of generation times corresponding to the sensing signals and a plurality of positions of the positioning device 110 corresponding to the generation times.

For example, when the processing device 130 receives the sensing signal A1, the processing device 130 may analyze the sensing signal A1 to obtain the generation time TA1 corresponding to the sensing signal A1 and the position A of the positioning device 110 corresponding to the generation time TA1. Then, when the processing device 130 receives the sensing signal B1, the processing device 130 may analyze the sensing signal B1 to obtain the generation time TB1 corresponding to the sensing signal B1 and the position B of the positioning device 110 corresponding to the generation time TB1. Afterward, when the processing device 130 receives the sensing signal C1, the processing device 130 may analyze the sensing signal C1 to obtain the generation time TC1 corresponding to the sensing signal C1 and the position C of the positioning device 110 corresponding to the generation time TC1.

When the processing device 130 receives the sensing signal B2, the processing device 130 may analyze the sensing signal B2 to obtain the generation time TB2 corresponding to the sensing signal B2 and the position B of the positioning device 110 corresponding to the generation time TB2. When the processing device 130 receives the sensing signal A2, the processing device 130 may analyze the sensing signal A2 to obtain the generation time TA2 corresponding to the sensing signal A2 and the position A of the positioning device 110 corresponding to the generation time TA2. When the processing device 130 receives the sensing signal XX1, it indicates that positioning device 120 already leaves the sensing area 112. The processing device 130 may analyze the sensing signal XX1 to obtain the generation time TXX1 corresponding to the sensing signal XX1 and the position of the positioning device 110 corresponding to the generation time TXX1. The rest of generation times corresponding to the sensing signals and the rest of positions of the positioning device corresponding to the generation times are similar and their operation may be discerned by analogy.

Then, the processing device 130 may count the generation times and the positions to generate the first processing result. For example, the processing device 130 may calculate a residence time MTA1 of the position A of the positioning device 110 corresponding to the generation time TA1 according to the generation time TA1 and the generation time TB1. For example, the processing device 130 subtracts the generation time TA1 from the generation time TB1.

The processing device 130 may calculate a residence time MTB1 of the position B of the positioning device 110 corresponding to the generation time TB1 according to the generation time TB1 and the generation time TC1. For example, the processing device 130 subtracts the generation time TB1 from the generation time TC1. The processing device 130 may calculate a residence time MTC1 of the position C of the positioning device 110 corresponding to the generation time TC1 according to the generation time TC1 and the generation time TB2. For example, the processing device 130 subtracts the generation time TC1 from the generation time TB2.

The processing device 130 may calculate a residence time MTB2 of the position B of the positioning device 110 corresponding to the generation time TB2 according to the generation time TB2 and the generation time TA2. For example, the processing device 130 subtracts the generation time TB2 from the generation time TA2. The processing device 130 may calculate a residence time MTA2 of the position A of the positioning device 110 corresponding to the generation time TA2 according to the generation time TA2 and the generation time TXX1. For example, the processing device 130 subtracts the generation time TA2 from the generation time TXX1.

Then, the processing device 130 may count the residence times of the same position to obtain the existence time of each of positions of the positioning device 110 in the sensing area 112. For example, the processing device 130 may count the residence times of the positioning device 110 in the position A to obtain the existence time TA of the position A of the positioning device 110 in the sensing area 112. For example, the processing device 130 adds the residence time MTA1 and the residence time MTA2.

The processing device 130 may count the residence times of the positioning device 110 in the position B to obtain the existence time TB of the position B of the positioning device 110 in the sensing area 112. For example, the processing device 130 adds the residence time MTB1 and the residence time MTB2. The processing device 130 may also count the residence times of the positioning device 110 in the position C to obtain the existence time TC of the position C of the positioning device 110 in the sensing area 112. The rest of existence times of the positions of the positioning device 110 in the sensing area 112 are similar and their operation may be discerned by analogy.

In addition, the processing device 130 may obtain the position distribution and movement trajectory of the positioning device 110 in the sensing area according to the positions of the positioning device 110 and the residence time and the existence time of each of the positions of the positioning device 110. Then, the processing device 130 may take the existence time of the each of the positions of the positioning device 110 in the sensing area 112 and the position distribution and the movement trajectory of the positioning device 110 in the sensing area 112 as a first processing result and outputs the first processing result.

Figure 2A:
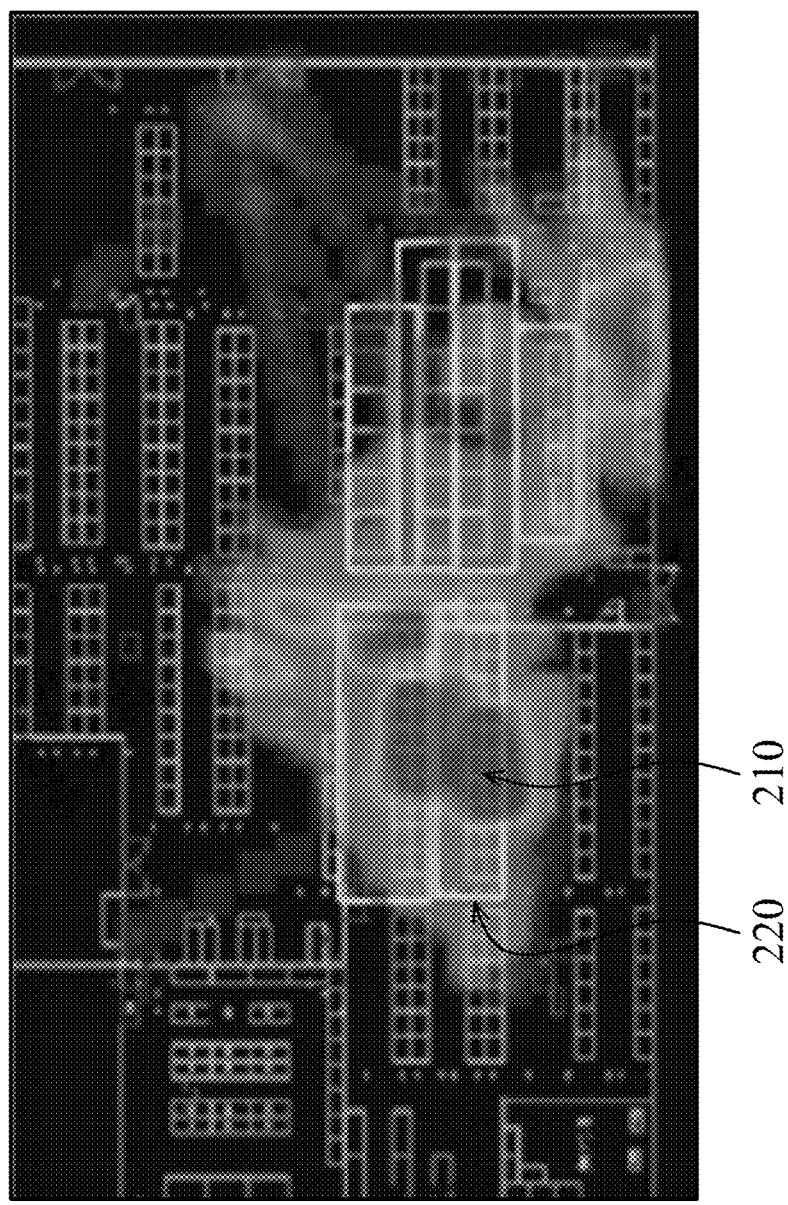
FIGS. 2A, 2B and 2C show a schematic view of a first processing result according to an embodiment of the present invention.

The display device 140 receives and displays the first processing result generated by the processing device 130. In some embodiments, the first processing result is displayed, for example, by a heat map, as shown in FIG. 2A. In FIG. 2A, an area 210 indicates that the existence of the positioning device 110 in the position is longer and the color of the area 210 is darker. An area 220 indicates that the existence of the positioning device 110 in the position is shorter and the color of the area 210 is lighter. The rest of existence of the positioning device 110 in other positions and the color of the corresponding areas are similar and their operation may be discerned by analogy.

Figure 2B:
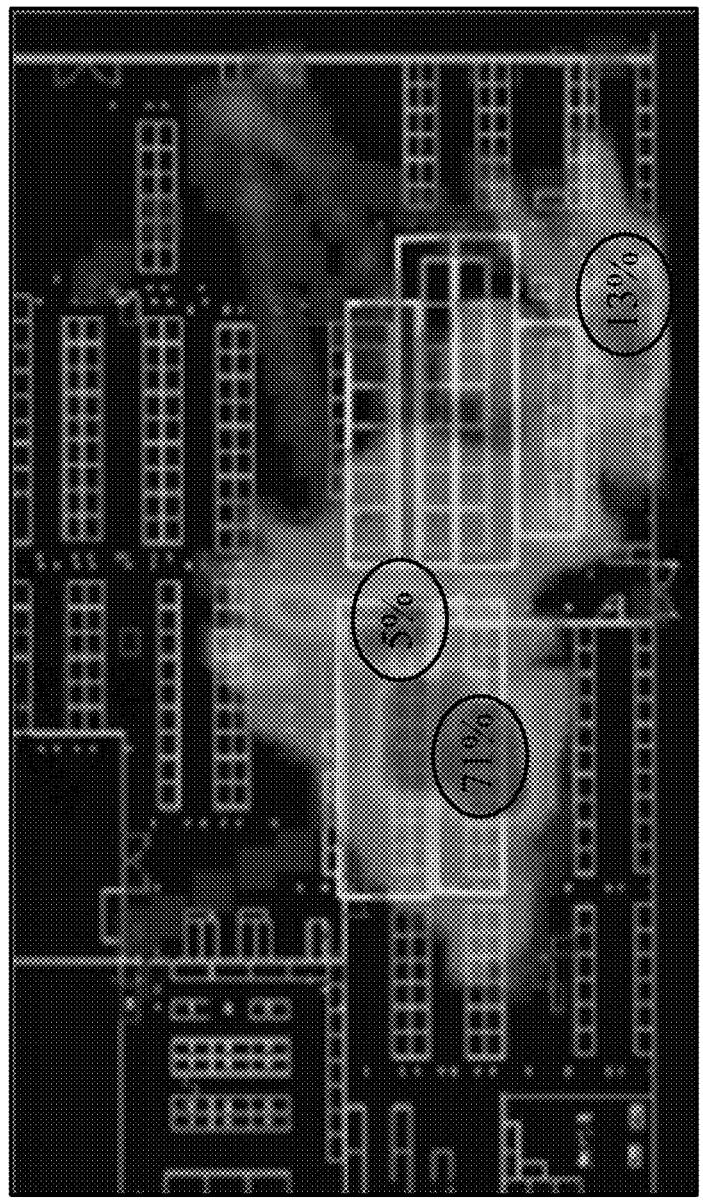

In some embodiments, the first processing result is displayed, for example, by a scale chart, as shown in FIG. 2B. In FIG. 2B, a ratio "71%" indicates that the existence time of the positioning device 110 in the position is longer and occupies 71% of the total time, and a ratio "5%" indicates that the existence time of the positioning device 110 in the position is shorter and occupies 5% of the total time. The rest of ratios are similar and their operation may be discerned by analogy. In addition, the ratios displayed in FIG. 2B may be combined with the heat map displayed in FIG. 2A, so as to increase the display effect.

Figure 2C:
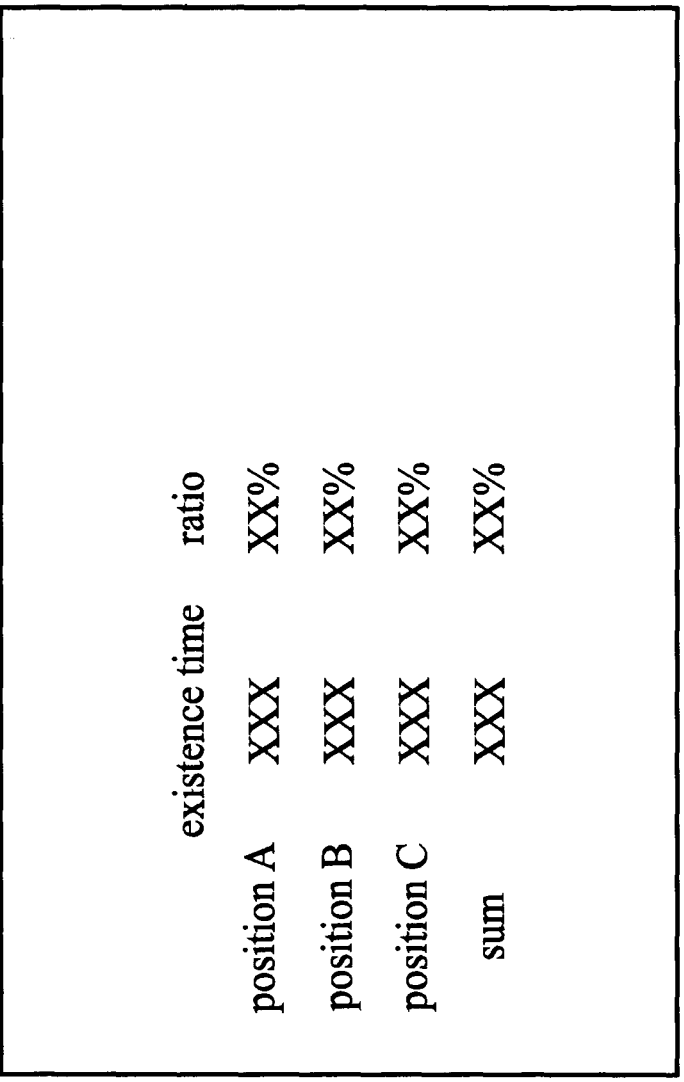

In some embodiments, the first processing result is displayed, for example, by a statistical form, as shown in FIG. 2C. In FIG. 2C, the existence time of each of the positions (such as the position A, the position B and the position C) of the positioning device 110 in the sensing area 112 and the corresponding ratio thereof may be displayed on a monitoring frame 230. The sum of the existence times of the positioning device 110 and the corresponding ratio thereof may also be displayed on the monitoring frame 230.

Therefore, the monitoring staff may effectively know the position distribution and the movement trajectory of the positioning device 110 in the sensing area 112 through the first processing result displayed on the display device 140. Furthermore, the monitoring staff may adjust the operation mode and process of an object corresponding to the positioning device 110 according to the position distribution and the movement trajectory of the positioning device 110, so as to increase the working efficiency of the object.

In addition, in the embodiment, the processing device 130 may further obtain the existence time of the positioning device 110 in the area 113. For example, the processing device 110 count a time between the positioning device 110 leaving the sensing area 112 and entering the sensing area 112. That is, the processing device 130 subtracts the time of the positioning device 110 leaving the sensing area 112 from the time of the positioning device 110 entering the sensing area 112. Then, the processing device 130 may compare the existence time of the positioning device in the area 113 with a predetermined time.

When the existence time of the positioning device 110 in the area 113 exceeds the predetermined time, the processing device 130 may generate, for example, a warning message. The warning message may be displayed, for example, on the display device 140, so that the monitoring staff may know an abnormality. Afterward, the monitoring staff may designate the processing staff to the scene to understand the state, so as to know what happened to the object having the positioning device 110 in the area 113.

In addition, when the existence time of the positioning device 110 in the area 113 exceeds the predetermined time, the processing device 130 may also generate a control signal to control a photographing device in the monitoring area 111 for photographing the monitoring area 111, and the processing device 130 may obtain an image of the positioning device 110 in the area 113. Then, the image is displayed on the display device 140. Therefore, the monitoring staff may understand what happened to the object having the positioning device 110 in the area 113 through the image.

In the embodiment, there is one positioning device 110, but the embodiment of the present invention is not limited thereto. There may be two or more positioning devices 110. The monitoring manner of each of the positioning devices 110 is consistent with the description of the above embodiments, and the description thereof is not repeated herein.

Furthermore, the sensing device 120 may sense the motion of the positioning device 110 outside the sensing area 112 (i.e., the area 113) of the monitoring area 111 to generate a plurality of sensing signals corresponding to the area 113. The processing device 130 receives the sensing signals corresponding to the area 113. The processing device 130 analyzes and calculates the sensing signals corresponding to the area 113 to generate a second processing result associated with the motion of the positioning device 110. In the embodiment, the sensing signals corresponding to the area 113 analyzed and calculated by the processing device 130 is consistent with the sensing signals corresponding to the sensing area 112 analyzed and calculated by the processing device 130, and the description thereof is not repeated herein. Furthermore, the manner for displaying the second processing result may also refer to FIGS. 2A to 2C, and the description thereof is not repeated herein.

Furthermore, the processing device 130 analyzes the sensing signals corresponding to the area to obtain a plurality of the generation times corresponding to the above sensing signals and a plurality of the positions of the positioning device 110 corresponding to the generation times. The processing device 130 counts the generation times and the positions to generate the second processing result associated with the motion of the positioning device 110. In the embodiment, the second processing result includes the existence time of each of the positions of the positioning device 110 in the area 113 and the position distribution and movement trajectory of the positioning device 110 in the area 113. In addition, the manner of calculating and counting the positioning device 110 in the area 113 is consistent with that in the sensing area 112, and the description thereof is not repeated herein. Therefore, the monitoring staff may effectively know the position distribution and the movement trajectory of the positioning device 110 in the area 113 through the second processing result displayed on the display device 140, so as to perform the corresponding process.

Figure 3:
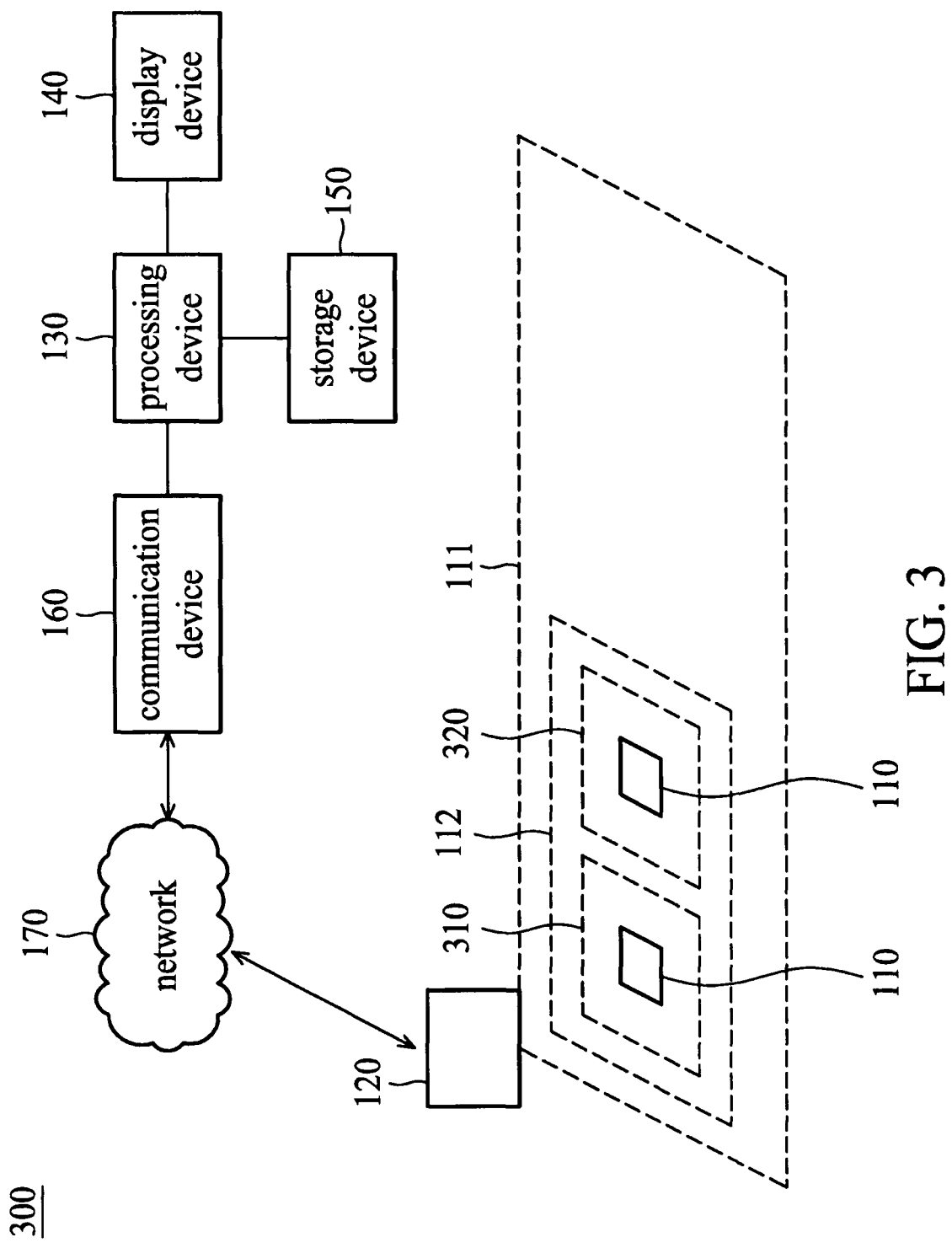
FIG. 3 shows a schematic view of a monitoring system for a positioning device according to another embodiment of the present invention.

FIG. 3 shows a schematic view of a monitoring system for a positioning device according to another embodiment of the present invention. Please refer to FIG. 3. The monitoring system for a positioning device 300 includes a positioning device 110, a sending device 120, a processing device 130 and a display device 140. In the embodiment, the positioning device 110 and the sensing device 120 in FIG. 3 are identical to the positioning device 110 and the sensing device 120 in FIG. 1. Accordingly, the positioning device 110 and the sensing device 120 in FIG. 3 is consistent with the description of the embodiment in FIG. 1, and the description thereof is not repeated herein.

The processing device 130 may define an area 310 and an area 320 in the sensing area 112, wherein the area 310 does not overlap the area 320. For example, the processing device 130 may define the area 310 and the area 320 as different effective working areas. That is, the time when the positioning device 110 is located in the area 310 and the area 320 may be regarded as an effective working-hour.

Then, the processing device 130 analyzes the sensing signals to obtain a plurality of generation times corresponding to the sensing signals and a plurality of first positions and a plurality of second positions of the positioning device 110 corresponding to the generation times. In the embodiment, the first positions correspond to the first area (such as the area 310), and the second positions correspond to the second area (such as the area 320). For example, the processing device 130 determines the positions of the positioning device 110 in the area 310 and the area 320 according to obtained coordinates of the positions of the positioning device 110 at different time points. In the embodiment, the positions of the positioning device 110 located in the area 310 serve as the first positions of the positioning device 110, and the positions of the positioning device 110 located in the area 320 serve as the second positions of the positioning device 110.

Afterward, the processing device 130 may count the generation times, the first positions and the second positions to generate the first processing result. In the embodiment, the first processing result includes the existence time of each of the first positions of the positioning device 110 in the first area 310; the position distribution and movement trajectory of the positioning device 110 in the first area 310; the existence time of each of the second positions of the positioning device 110 in the second area 320; the position distribution and movement trajectory of the positioning device 110 in the second area 320; and the sum of the existence times of all of the first positions and the existence times of all of the second positions and the corresponding ratio thereof. The sum of the existence time of each of the first positions and the existence time of each of the second positions is an effective proxy for the working hours of the positioning device 110.

In addition, a related operation of the processing device 130 is consistent with the description of the processing device 130 in FIG. 1, and the description thereof is not repeated herein. Afterward, the display device 140 displays the first processing result generated by the processing device 130, and the first processing result may be displayed as shown in FIG. 2A, FIG. 2B or FIG. 2C.

In the embodiment, the monitoring staff may effectively know the position distribution and the movement trajectory of the positioning device 110 in the area 310 and the area 320 through the first processing result displayed on the display device 140. Furthermore, the monitoring staff may adjust the operation mode and process of an object corresponding to the positioning device 110 according to the position distribution and the movement trajectory of the positioning device 110, so as to increase the working efficiency of the object.

In the embodiment, there is one positioning device 110, but the embodiment of the present invention is not limited thereto. There may be two or more positioning devices 110. The monitoring manner of each of the positioning devices 110 is consistent with the description of the above embodiments, and the description thereof is not repeated herein. In addition, there are two effective working areas above, i.e., area 310 and area 320, but the embodiment of the present invention is not limited thereto. There may be three or more effective working areas. The monitoring manner of each of the positioning devices 110 is consistent with the description of the above embodiments, and the description thereof is not repeated herein.

Figure 4:
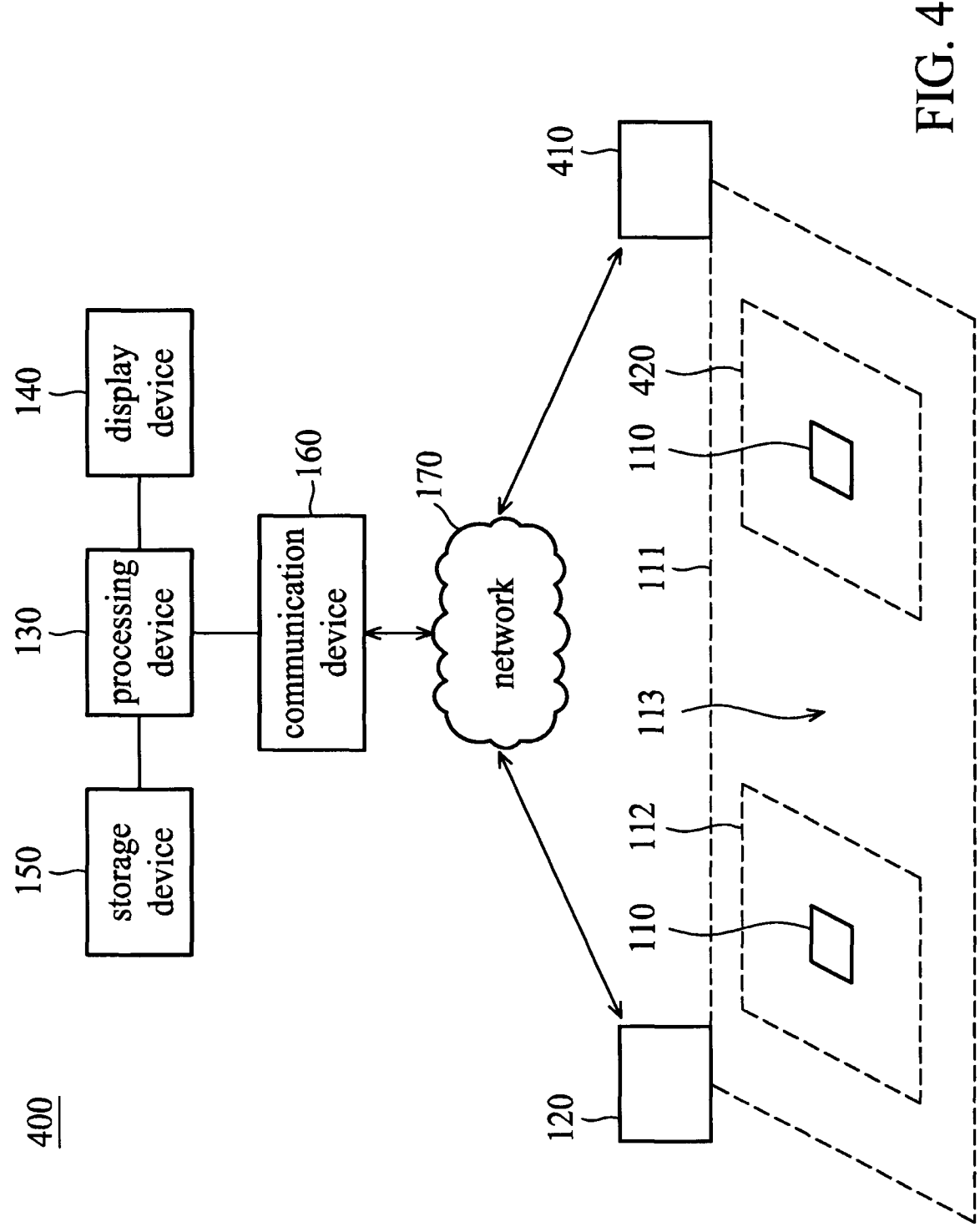
FIG. 4 shows a schematic view of a monitoring system for a positioning device according to another embodiment of the present invention.

FIG. 4 shows a schematic view of a monitoring system for a positioning device according to another embodiment of the present invention. Please refer to FIG. 4. The monitoring system for the positioning device 400 includes a positioning device 110, a sensing device 120, a sensing device 410, a processing device 130 and a display device 140. The positioning device 110 and the sensing device 120 in FIG. 4 are identical to positioning device 110 and the sensing device 120 in FIG. 1. Accordingly, the positioning device 110 and the sensing device 120 in FIG. 4 is consistent with the description of the embodiment in FIG. 1, and the description thereof is not repeated herein.

In the embodiment, the processing device 130 may define the sensing area 112 and the sensing area 420 as different effective working areas. In the embodiment, the sensing area 112 does not overlap the sensing area 420. That is, the time when the positioning device 110 is located in the sensing area 112 and the sensing area 420 may be regarded as an effective working-hour. The sensing device 410 senses the motion of the positioning device 110 in the sensing area 420 to generate a plurality of second sensing signals. In the embodiment, a related operation of the sensing device 410 is consistent with the description of the sensing device 120 in FIG. 1, and the description thereof is not repeated herein.

The processing device 130 receives the first sensing signals generated by the sensing device 120 and the second sensing signals generated by the sensing device 410 through the network 170. The processing device 130 analyzes and calculates the first sensing signals and the second sensing signals to generate the first processing result. Furthermore, the processing device 130 analyzes the first sensing signals to obtain a plurality of first generation times corresponding to the first sensing signals and a plurality of first positions of the positioning device 110 corresponding to the generation times. The processing device 130 analyzes the second sensing signals to obtain a plurality of second generation times corresponding to the second sensing signals and a plurality of second positions of the positioning device 110 corresponding to the second generation times. Then, the processing device 130 counts the first generation time, the second generation time, the first positions and the second positions to generate the first processing result.

In the embodiment, the first processing result includes the existence time of each of the first positions of the positioning device 110 in the sensing area 112; the position distribution and the movement trajectory of the positioning device 110 in the sensing area 112; the existence time of each of the second positions of the positioning device 110 in the sensing area 420; the position distribution and the movement trajectory of the positioning device 110 in the sensing area 420; and the sum of the existence times of all of the first positions and the existence times of all of the second positions and the corresponding ratio thereof. The sum of the existence time of each of the first positions and the existence time of each of the second positions effectively represents the working hours of the positioning device 110. Afterward, the display device 140 displays the first processing result generated by the processing device 130, and the first processing result may be displayed as shown in FIG. 2A, FIG. 2B or FIG. 2C.

In the embodiment, the monitoring staff may effectively know the position distribution and the movement trajectory of the positioning device 110 in the sensing area 112 and the sensing area 420 through the first processing result displayed on the display device 140. Furthermore, the monitoring staff may adjust the operation mode and process of an object corresponding to the positioning device 110 according to the position distribution and the movement trajectory of the positioning device 110, so as to increase the working efficiency of the object.

In the embodiment, there is one positioning device 110, but the embodiment of the present invention is not limited thereto. There may be two or more positioning devices 110. The monitoring manner of each of the positioning devices 110 is consistent with the description of the above embodiments, and the description thereof is not repeated herein. In addition, there are two sensing devices, i.e., sensing devices 112 and 410, and there are two sensing areas, i.e., sensing areas 112 and 420, but the embodiment of the present invention is not limited thereto. There may be three or more sensing devices, and three or more sensing areas. The monitoring manner of each of the positioning devices 110 is consistent with the description of the above embodiments, and the description thereof is not repeated herein.

Figure 5:
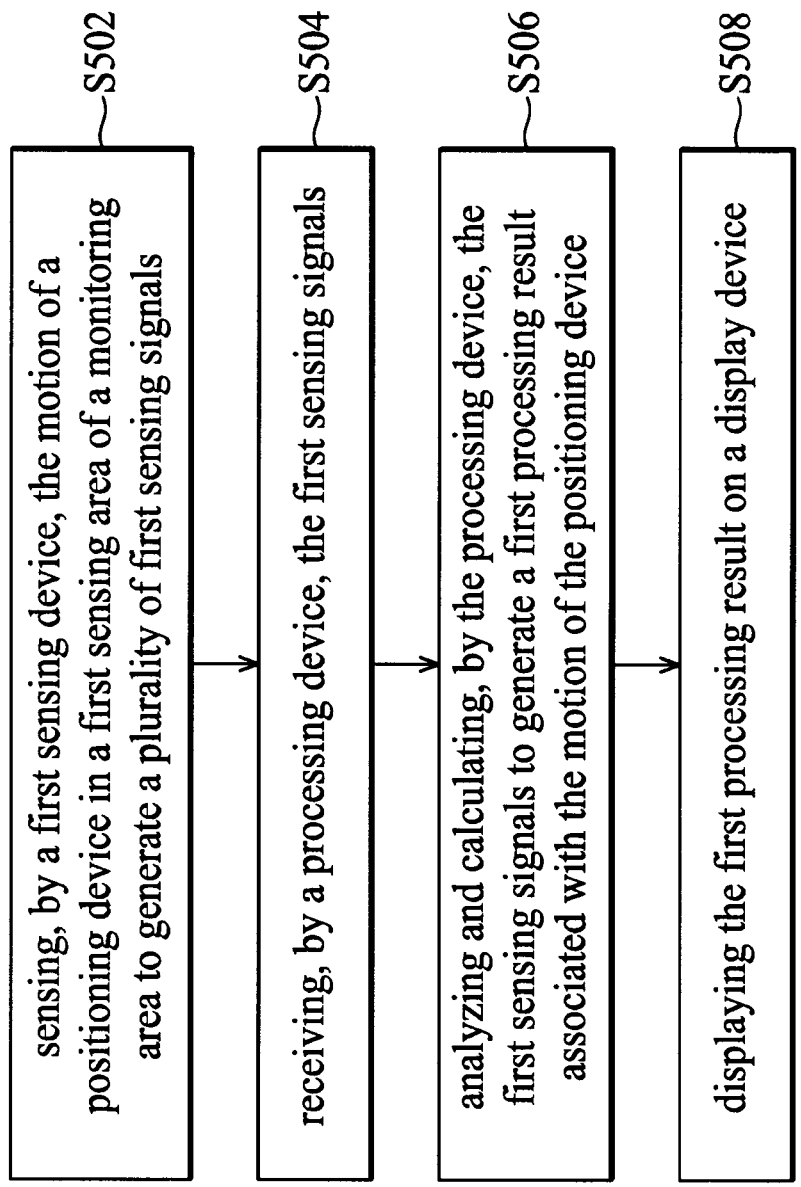
FIG. 5 shows a flowchart of a monitoring method for a positioning device according to an embodiment of the present invention.

FIG. 5 shows a flowchart of a monitoring method for a positioning device according to an embodiment of the present invention. In step S502, the method involves sensing, by a first sensing device, the motion of a positioning device in a first sensing area of a monitoring area to generate a plurality of first sensing signals.

In step S504, the method involves receiving, by a processing device, the first sensing signals. In step S506, the method involves analyzing and calculating, by the processing device, the first sensing signals to generate a first processing result associated with the motion of the positioning device. In step S508, the method involves displaying the first processing result on a display device. In the embodiment, the first processing result is displayed in a heat map, a scale chart or a statistical form.

Figure 6:
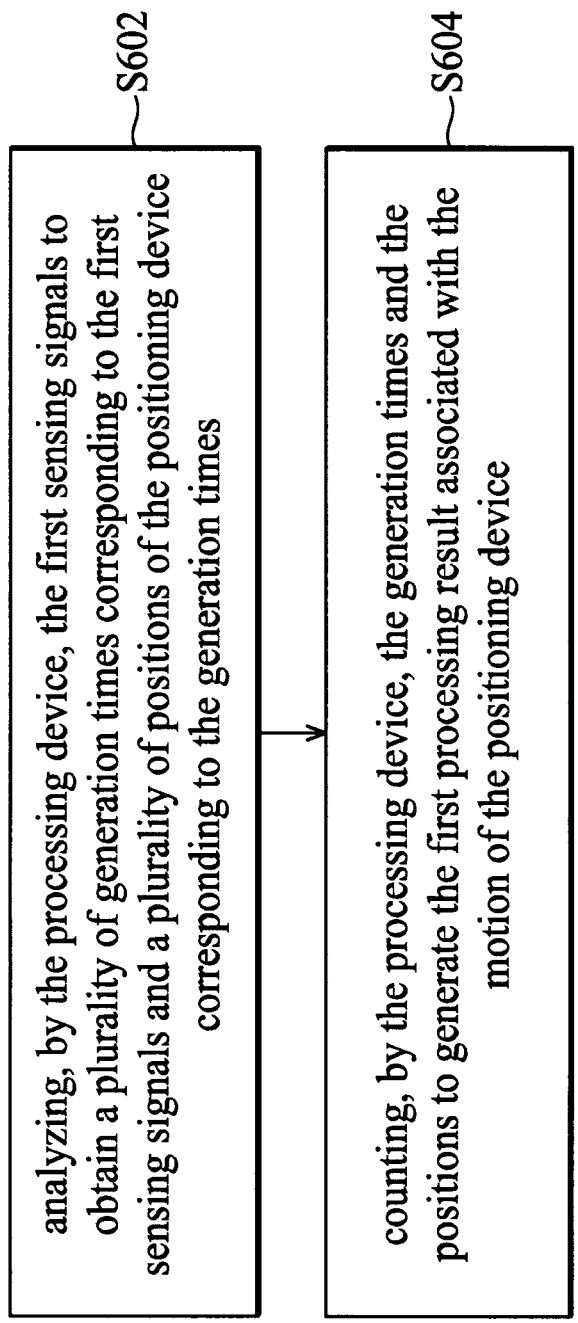
FIG. 6 shows a detailed flowchart of step S506 in FIG. 5.

FIG. 6 shows a detailed flowchart of step S506 in FIG. 5. In step S602, the method involves analyzing, by the processing device, the first sensing signals to obtain a plurality of generation times corresponding to the first sensing signals and a plurality of positions of the positioning device corresponding to the generation times. In step S604, the method involves counting, by the processing device, the generation times and the positions to generate the first processing result associated with the motion of the positioning device. In the embodiment, the first processing result includes the existence time of the positioning device in each of the positions in the first sensing area and the position distribution and movement trajectory of the positioning device in the first sensing area.

Figure 7:
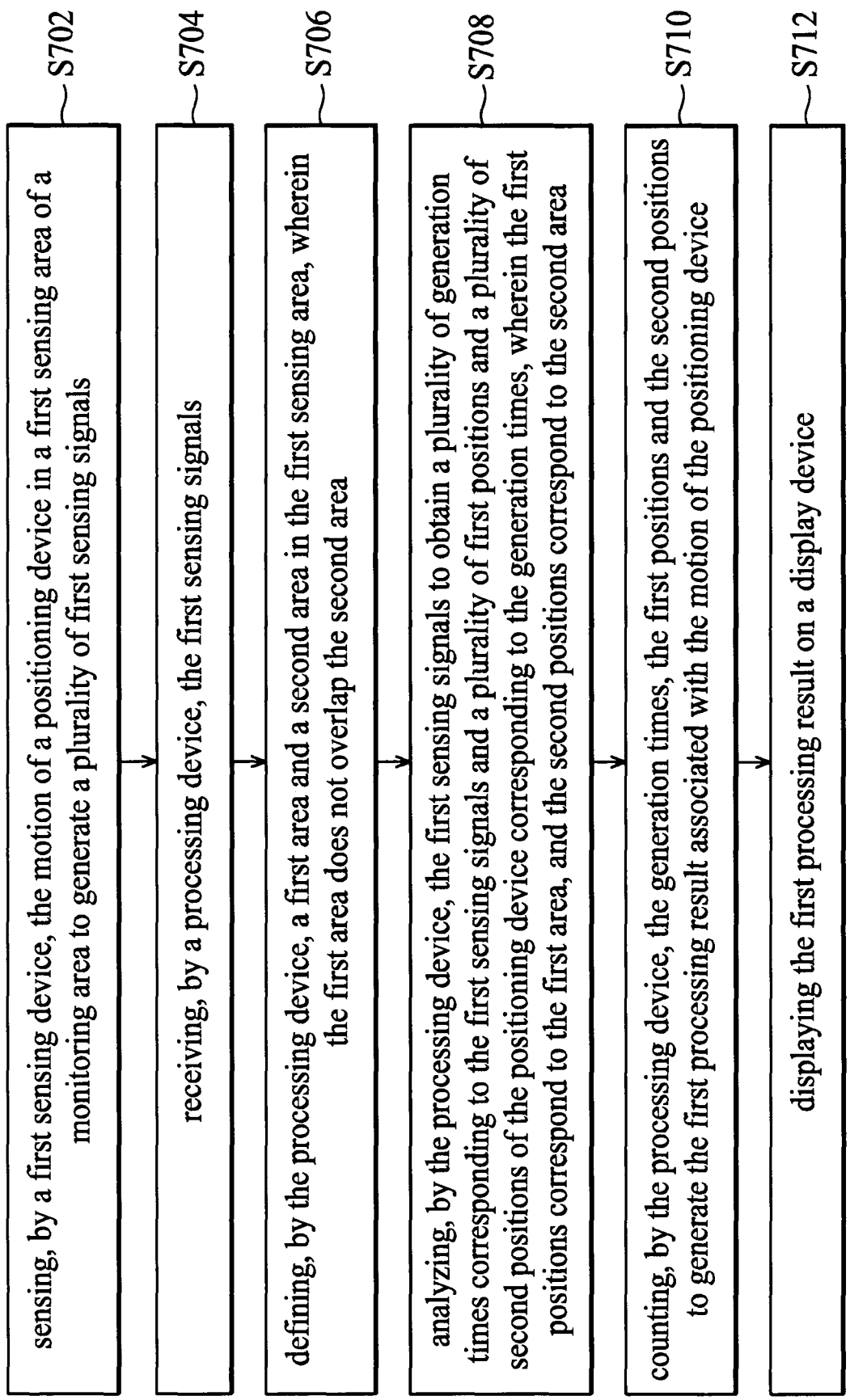
FIG. 7 shows a flowchart of a monitoring method for a positioning device according to another embodiment of the present invention.

FIG. 7 shows a flowchart of a monitoring method for a positioning device according to another embodiment of the present invention. In step S702, the method involves sensing, by a first sensing device, the motion of a positioning device in a first sensing area of a monitoring area to generate a plurality of first sensing signals. In step S704, the method involves receiving, by a processing device, the first sensing signals.

In step S706, the method involves defining, by the processing device, a first area and a second area in the first sensing area, wherein the first area does not overlap the second area. In step S708, the method involves analyzing, by the processing device, the first sensing signals to obtain a plurality of generation times corresponding to the first sensing signals and a plurality of first positions and a plurality of second positions of the positioning device corresponding to the generation times, wherein the first positions correspond to the first area, and the second positions correspond to the second area.

In step S710, the method involves counting, by the processing device, the generation times, the first positions and the second positions to generate the first processing result associated with the motion of the positioning device. In the embodiment, the first processing result includes the existence time of each of the first positions of the positioning device in the first area; the position distribution and movement trajectory of the positioning device in the first area; the existence time of each of the second positions of the positioning device in the second area; the position distribution and movement trajectory of the positioning device in the second area; and the sum of the existence times of all of the first positions and the existence times of all of the second positions. In step S712, the method involves displaying the first processing result on a display device. In the embodiment, the first processing result is displayed in a heat map, a scale chart or a statistical form.

Figure 8:
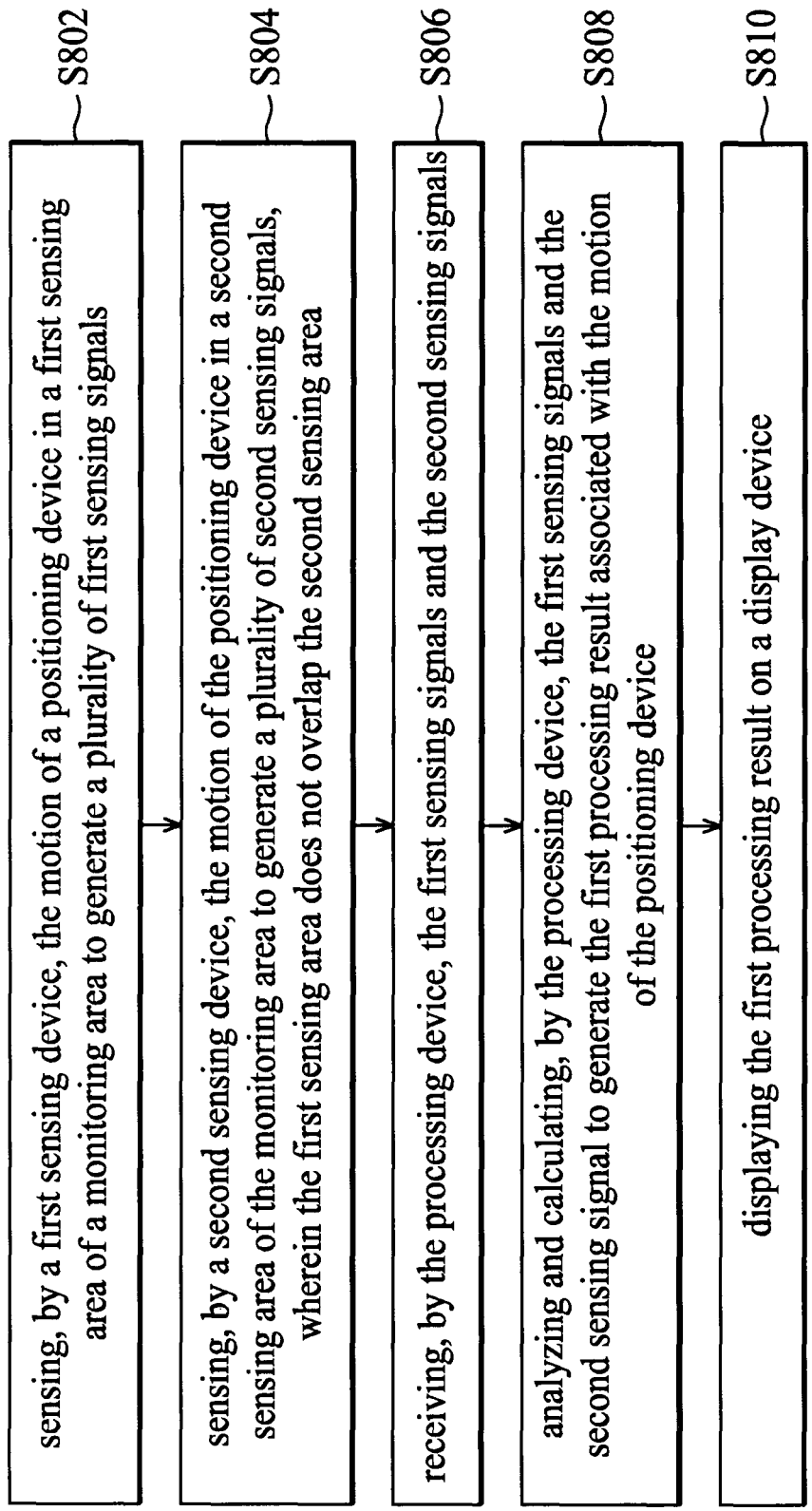
FIG. 8 shows a flowchart of a monitoring method for a positioning device according to another embodiment of the present invention.

FIG. 8 shows a flowchart of a monitoring method for a positioning device according to another embodiment of the present invention. In step S802, the method involves sensing, by a first sensing device, the motion of a positioning device in a first sensing area of a monitoring area to generate a plurality of first sensing signals. In step S804, the method involves sensing, by a second sensing device, the motion of the positioning device in a second sensing area of the monitoring area to generate a plurality of second sensing signals, wherein the first sensing area does not overlap the second sensing area.

In step S806, the method involves receiving, by the processing device, the first sensing signals and the second sensing signals. In step S808, the method involves analyzing and calculating, by the processing device, the first sensing signals and the second sensing signal to generate the first processing result associated with the motion of the positioning device. In step S810, the method involves displaying the first processing result on a display device. In the embodiment, the first processing result is displayed in a heat map, a scale chart or a statistical form.

Figure 9:
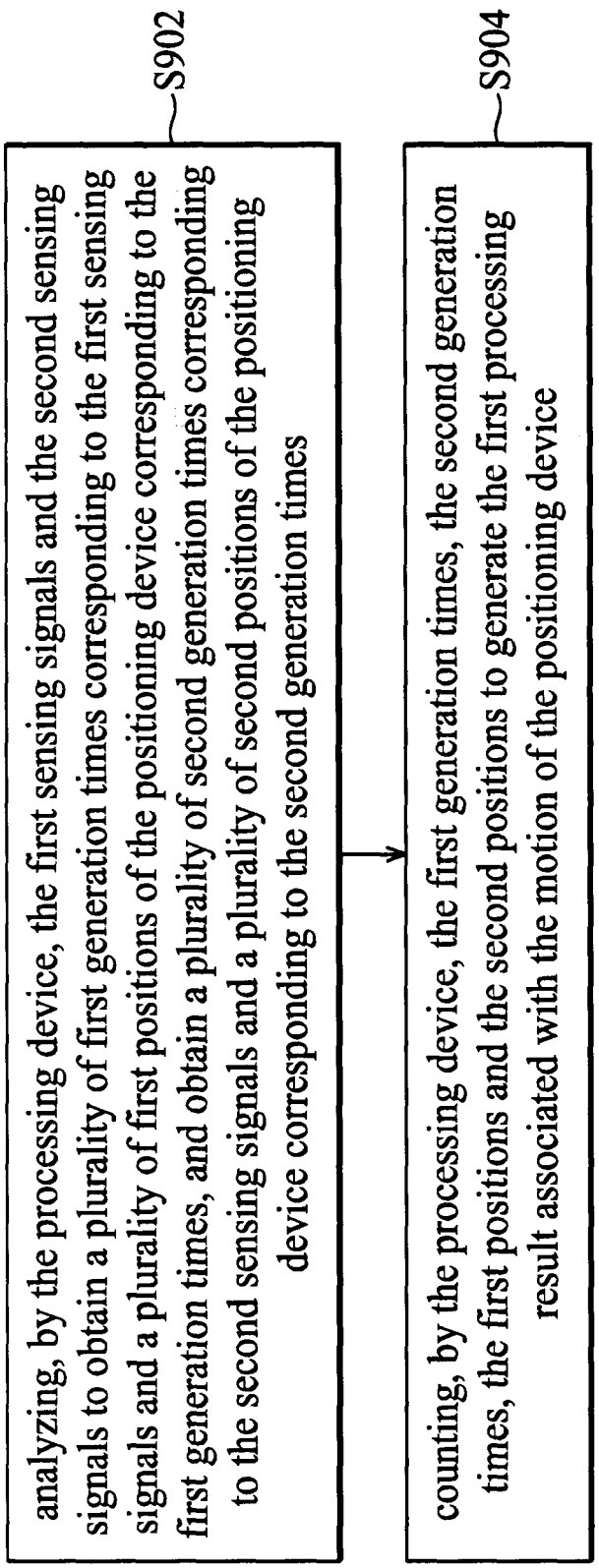
FIG. 9 shows a detailed flowchart of step S808 in FIG. 8.

FIG. 9 shows a detailed flowchart of step S808 in FIG. 8. In step S902, the method involves analyzing, by the processing device, the first sensing signals and the second sensing signals to obtain a plurality of first generation times corresponding to the first sensing signals and a plurality of first positions of the positioning device corresponding to the first generation times, and obtain a plurality of second generation times corresponding to the second sensing signals and a plurality of second positions of the positioning device corresponding to the second generation times. In step S904, the method involves counting, by the processing device, the first generation times, the second generation times, the first positions and the second positions to generate the first processing result associated with the motion of the positioning device. In the embodiment, the first processing result includes the existence time of each of the first positions of the positioning device in the first sensing area; the position distribution and movement trajectory of the positioning device in the first sensing area; the existence time of each of the second positions of the positioning device in the second sensing area; the position distribution and movement trajectory of the positioning device in the second sensing area; and the sum of the existence times of all of the first positions and the existence times of all of the second positions.

Figure 10:
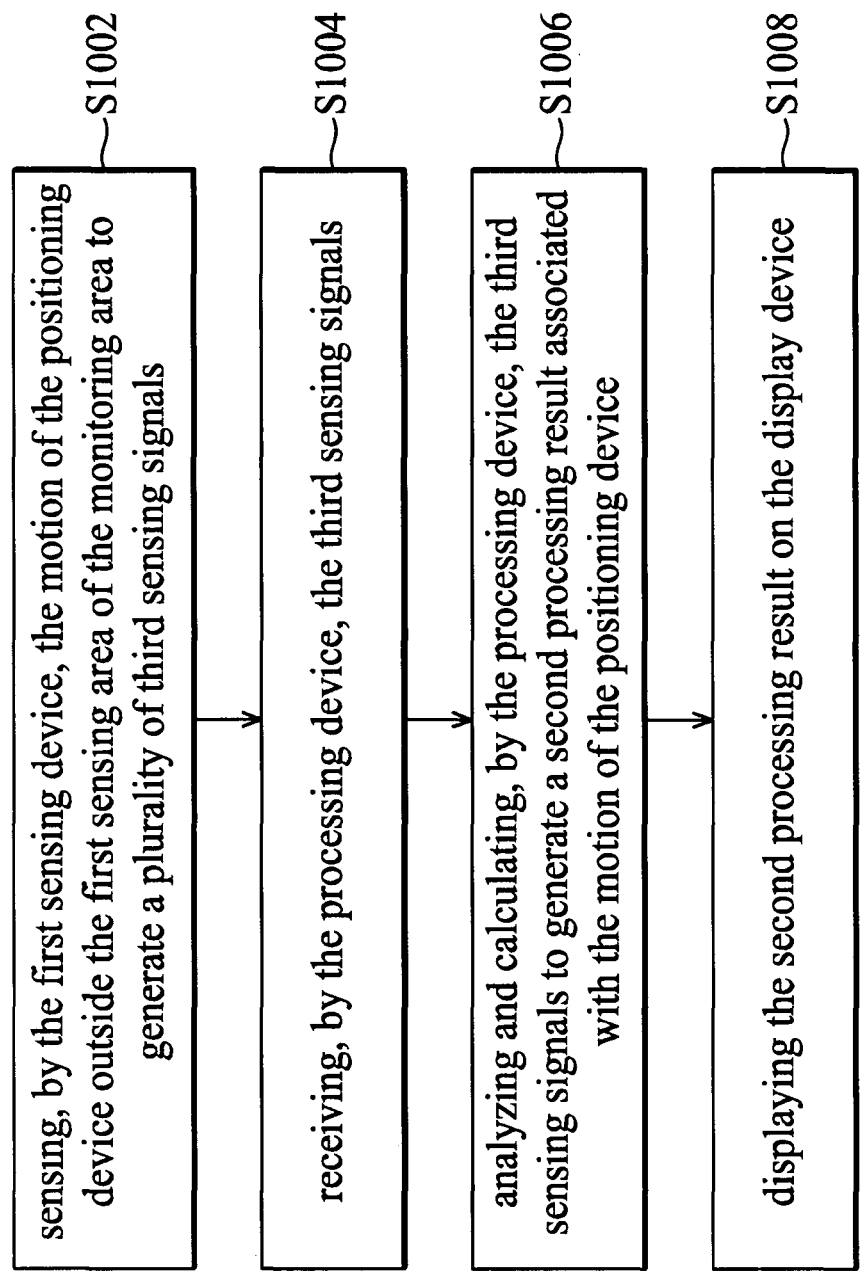
FIG. 10 shows a flowchart of a monitoring method for a positioning device according to another embodiment of the present invention.

FIG. 10 shows a flowchart of a monitoring method for a positioning device according to another embodiment of the present invention. In step S1002, the method involves sensing, by the first sensing device, the motion of the positioning device outside the first sensing area of the monitoring area to generate a plurality of third sensing signals. In step S1004, the method involves receiving, by the processing device, the third sensing signals. In step S1006, the method involves analyzing and calculating, by the processing device, the third sensing signals to generate a second processing result associated with the motion of the positioning device. In step S1008, the method involves displaying the second processing result on the display device.

Figure 11:
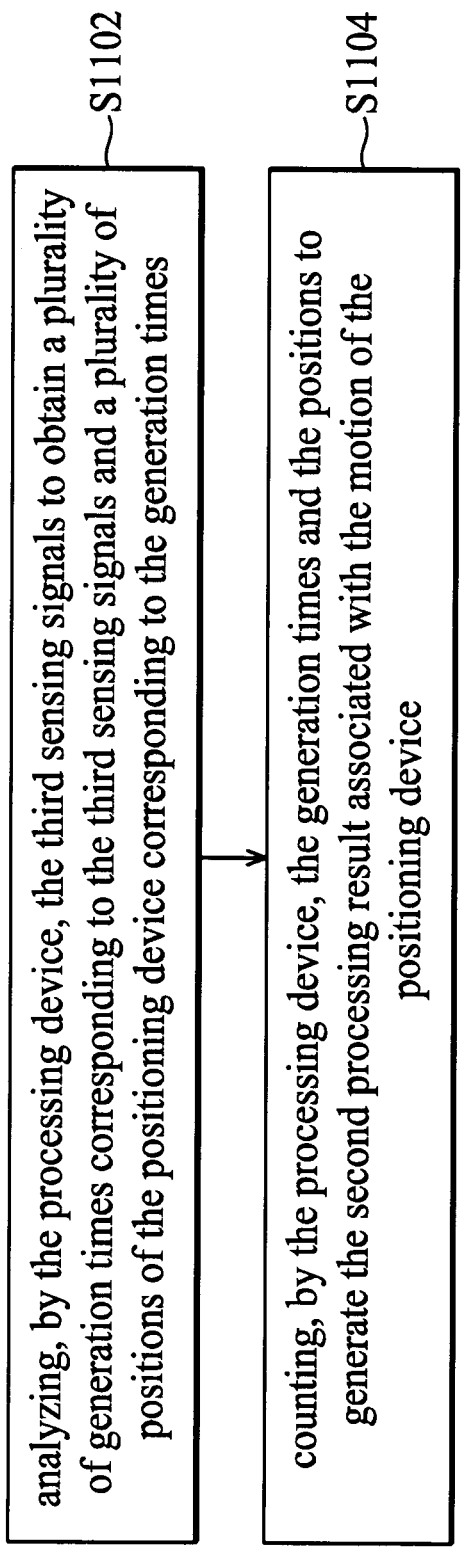
FIG. 11 shows a detailed flowchart of step S1006 in FIG. 10.

FIG. 11 shows a detailed flowchart of step S1006 in FIG. 10. In step S1102, the method involves analyzing, by the processing device, the third sensing signals to obtain a plurality of generation times corresponding to the third sensing signals and a plurality of positions of the positioning device corresponding to the generation times. In step S1104, the method involves counting, by the processing device, the generation times and the positions to generate the second processing result associated with the motion of the positioning device. In the embodiment, the second processing result includes the existence time of each of the positions of the positioning device outside the first sensing area and the position distribution and movement trajectory of the positioning device outside the first sensing area.

In addition, the above monitoring method for the positioning device may further include the following steps (not shown). An existence time of the positioning device outside the first sensing area is obtained by the processing device. The existence time is compared with a predetermined time. When the existence time exceeds the predetermined time, the processing device generates a control signal in response to the existence time exceeding a predetermined time to control a photographing device for photographing the monitoring area, and obtains an image of the positioning device. The image is displayed on the display device.

In summary, according to the monitoring method and system for the positioning device disclosed by the embodiment of the present invention, the sensing device senses the motion of the positioning device in the sensing area of the monitoring area to generate the first sensing signals. The processing device receives the sensing signals, analyzes and calculates the sensing signals to generate the first processing result associated with the motion of the positioning device, and displays the first processing result. In addition, in the embodiment of the present invention, the sensing device further senses the motion of the positioning device outside the sensing area to generate the second sensing signals. The processing device receives the second sensing signals, analyzes and calculates the second sensing signals to generate the second processing result associated with the motion of the positioning device, and displays the second processing result. Therefore, the position distribution and the movement trajectory of the positioning device may effectively be known, and the timeliness of monitoring and the convenience of use are increased.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A monitoring method for a positioning device, comprising:
   sensing, by a first sensing device, a motion of a positioning device in a first sensing area of a monitoring area to generate a plurality of first sensing signals;
   receiving, by a processing device, the first sensing signals;
   analyzing and calculating, by the processing device, the first sensing signals to generate a first processing result associated with the motion of the positioning device; and
   displaying the first processing result on a display device;
   wherein the step of analyzing and calculating, by the processing device, the first sensing signals to generate the first processing result associated with the motion of the positioning device comprises:
   analyzing, by the processing device, the first sensing signals to obtain a plurality of generation times corresponding to the first sensing signals and a plurality of positions of the positioning device corresponding to the generation times; and
   counting, by the processing device, the generation times and the positions to generate the first processing result associated with the motion of the positioning device;
   wherein the first processing result comprises an existence time of each of the positions of the positioning device in the first sensing area, and a position distribution and movement trajectory of the positioning device in the first sensing area;
   wherein the existence time of each of the positions of the positioning device in the first sensing area is generated by counting residence times of the positioning device at each of the positions which are the same, and the residence time of the positioning device at each of the positions is generated by subtracting the generation time corresponding to the positioning device at each of the positions from the generation time corresponding to the positioning device moving to a next position.

2. The monitoring method for the positioning device as claimed in claim 1, wherein the step of analyzing and calculating, by the processing device, the first sensing signals to generate the first processing result associated with the motion of the positioning device further comprises:
   defining, by the processing device, a first area and a second area in the first sensing area, wherein the first area does not overlap the second area;
   analyzing, by the processing device, the first sensing signals to obtain the plurality of generation times corresponding to the first sensing signals and a plurality of first positions and a plurality of second positions of the positioning device corresponding to the generation times, wherein the first positions correspond to the first area, and the second positions correspond to the second area; and
   counting, by the processing device, the generation times, the first positions and the second positions to generate the first processing result associated with the motion of the positioning device, wherein the first processing result further comprises an existence time of each of the first positions of the positioning device in the first area; a position distribution and movement trajectory of the positioning device in the first area; an existence time of each of the second positions of the positioning device in the second area; a position distribution and movement trajectory of the positioning device in the second area; and a sum of the existence times of all of the first positions and the existence times of all of the second positions.

3. The monitoring method for the positioning device as claimed in claim 1, further comprising:
   sensing, by a second sensing device, the motion of the positioning device in a second sensing area of the monitoring area to generate a plurality of second sensing signals, wherein the first sensing area does not overlap the second sensing area;
   wherein the step of receiving, by the processing device, the first sensing signals further comprises: receiving, by the processing device, the first sensing signals and the second sensing signals;
   wherein the step of analyzing and calculating, by the processing device, the first sensing signals to generate the first processing result associated with the motion of the positioning device further comprises: analyzing and calculating, by the processing device, the first sensing signals and the second sensing signal to generate the first processing result associated with the motion of the positioning device.

4. The monitoring method for the positioning device as claimed in claim 3, wherein the step of analyzing and calculating, by the processing device, the first sensing signals and the second sensing signals to generate the first processing result associated with the motion of the positioning device comprises:
   analyzing, by the processing device, the first sensing signals and the second sensing signals to obtain a plurality of first generation times corresponding to the first sensing signals and a plurality of first positions of the positioning device corresponding to the first generation times, and obtain a plurality of second generation times corresponding to the second sensing signals and a plurality of second positions of the positioning device corresponding to the second generation times; and
   counting, by the processing device, the first generation times, the second generation times, the first positions and the second positions to generate the first processing result associated with the motion of the positioning device;
   wherein the first processing result further comprises an existence time of each of the first positions of the positioning device in the first sensing area; the position distribution and the movement trajectory of the positioning device in the first sensing area; an existence time of each of the second positions of the positioning device in the second sensing area; a position distribution and movement trajectory of the positioning device in the second sensing area; and a sum of the existence times of all of the first positions and the existence times of all of the second positions.

5. The monitoring method for the positioning device as claimed in claim 1, wherein the positioning device comprises a radio frequency identification electronic tag or an ultra-wide-band electronic tag.

6. The monitoring method for the positioning device as claimed in claim 1, further comprising:
   sensing, by the first sensing device, the motion of the positioning device outside the first sensing area of the monitoring area to generate a plurality of second sensing signals;
   receiving, by the processing device, the second sensing signals;

analyzing and calculating, by the processing device, the second sensing signals to generate a second processing result associated with the motion of the positioning device; and displaying the second processing result on the display device.

7. The monitoring method for the positioning device as claimed in claim 6, wherein the step of analyzing and calculating, by the processing device, the second sensing signals to generate the second processing result associated with the motion of the positioning device comprises:

analyzing, by the processing device, the second sensing signals to obtain a plurality of generation times corresponding to the second sensing signals and a plurality of positions of the positioning device corresponding to the generation times; and counting, by the processing device, the generation times and the positions to generate the second processing result associated with the motion of the positioning device;

wherein the second processing result comprises an existence time of each of the positions of the positioning device outside the first sensing area, and a position distribution and movement trajectory of the positioning device outside the first sensing area.

8. The monitoring method for the positioning device as claimed in claim 1, wherein the first processing result is displayed in a heat map, a scale chart or a statistical form.

9. The monitoring method for the positioning device as claimed in claim 1, further comprising:

obtaining, by the processing device, an existence time of the positioning device outside the first sensing area;

generating, by the processing device, a control signal in response to the existence time exceeding a predetermined time to control a photographing device for photographing the monitoring area and obtaining an image of the positioning device; and displaying the image on the display device.

10. A monitoring system for a positioning device, comprising:

an electronic tag, configured to move in a monitoring area;

a first base station, configured to sense a motion of the electronic tag in a first sensing area of the monitoring area to generate a plurality of first sensing signals;

a processor, configured to receive the first sensing signals, and analyze and calculate the first sensing signals to generate a first processing result associated with the motion of the electronic tag; and a display device, configured to display the first processing result;

wherein the processor analyzes the first sensing signals to obtain a plurality of generation times corresponding to the first sensing signals and a plurality of positions of the electronic tag corresponding to the generation times, and the processor counts the generation times and the positions to generate the first processing result associated with the motion of the electronic tag, wherein the first processing result comprises an existence time of each of the positions of the electronic tag in the first sensing area, and a position distribution and movement trajectory of the electronic tag in the first sensing area, wherein the existence time of each of the positions of the electronic tag in the first sensing area is generated by counting residence times of the electronic tag at each of the positions which are the same, and the residence time of the electronic tag at each of the positions is generated by subtracting the generation time corresponding to the electronic tag at each of the positions from the generation time corresponding to the electronic tag moving to a next position.

11. The monitoring system for the positioning device as claimed in claim 10, wherein the processor further defines a first area and a second area in the first sensing area;

wherein the first area does not overlap the second area, the processor further analyzes the first sensing signals to obtain the plurality of generation times corresponding to the first sensing signals and a plurality of first positions and a plurality of second positions of the electronic tag corresponding to the generation times;

wherein the first positions correspond to the first area, and the second positions correspond to the second area, and the processor counts the generation times, the first positions and the second positions to generate the first processing result associated with the motion of the electronic tag;

wherein the first processing result further comprises an existence time of each of the first positions of the electronic tag in the first area; a position distribution and movement trajectory of the electronic tag in the first area; an existence time of each of the second positions of the electronic tag in the second area; a position distribution and movement trajectory of the electronic tag in the second area; and a sum of the existence times of all of the first positions and the existence times of all of the second positions.

12. The monitoring system for the positioning device as claimed in claim 10, further comprising:

a second base station, configured to sense the motion of the electronic tag in a second sensing area of the monitoring area to generate a plurality of second sensing signals, wherein the first sensing area does not overlap the second sensing area;

wherein the processor further receives the first sensing signals and the second sensing signals, and analyzes and calculates the first sensing signals and the second sensing signals to generate the first processing result associated with the motion of the electronic tag.

13. The monitoring system for the positioning device as claimed in claim 12, wherein the processor further analyzes the first sensing signals and the second sensing signals to obtain a plurality of first generation times corresponding to the first sensing signals and a plurality of first positions of the electronic tag corresponding to the first generation times and to obtain a plurality of second generation times corresponding to the second sensing signals and a plurality of second positions of the electronic tag corresponding to the second generation times;

wherein the processor counts the first generation times, the second generation times, the first positions and the second positions to generate the first processing result associated with the motion of the electronic tag;

wherein the first processing result further comprises an existence time of each of the first positions of the electronic tag in the first sensing area; the position distribution and the movement trajectory of the electronic tag in the first sensing area; an existence time of each of the second positions of the electronic tag in the second sensing area; a position distribution and movement trajectory of the electronic tag in the second sensing area; and a sum of the existence times of all of the first positions and the existence times of all of the second positions.

14. The monitoring system for the positioning device as claimed in claim 10, wherein the electronic tag comprises a radio frequency identification electronic tag or an ultra-wide-band electronic tag.

15. The monitoring system for the positioning device as claimed in claim 10, wherein the first base station further senses the motion of the electronic tag outside the first sensing area in the monitoring area to generate a plurality of second sensing signals, the electronic tag receives the second sensing signals, the processor analyzes and calculates the second sensing signals to generate a second processing result associated with the motion of the electronic tag, and the display device displays the second processing result.

16. The monitoring system for the positioning device as claimed in claim 15, wherein the processor analyzes the second sensing signals to obtain a plurality of generation times corresponding to the second sensing signals and a plurality of positions of the electronic tag corresponding to the generation times, and the processor counts the generation times and the positions to generate the second processing result associated with the motion of the electronic tag;
wherein the second processing result comprises an existence time of each of the positions of the electronic tag outside the first sensing area, and a position distribution and movement trajectory of the electronic tag outside the first sensing area.

17. The monitoring system for the positioning device as claimed in claim 10, wherein the first processing result is displayed in a heat map, a scale chart or a statistical form.

18. The monitoring system for the positioning device as claimed in claim 10, wherein the processor further obtains an existence time of the electronic tag outside the first sensing area, the processor generates a control signal in response to the existence time exceeding a predetermined time to control a photographing device for photographing the monitoring area and obtains an image of the electronic tag, and the display device further displays the image.

* * * * *